US011245491B2

(12) United States Patent
Su et al.

(10) Patent No.: US 11,245,491 B2
(45) Date of Patent: *Feb. 8, 2022

(54) METHOD AND APPARATUS FOR TRANSMITTING OPTICAL TRANSPORT UNIT SIGNAL

(71) Applicant: Huawei Technologies Co., Ltd., Shenzhen (CN)

(72) Inventors: Wei Su, Dongguan (CN); Maarten Petrus Joseph Vissers, Amsterdam (NL); Qiuyou Wu, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/231,504

(22) Filed: Apr. 15, 2021

(65) Prior Publication Data
US 2021/0306091 A1  Sep. 30, 2021

Related U.S. Application Data

(63) Continuation of application No. 16/867,205, filed on May 5, 2020, now Pat. No. 10,992,413, which is a
(Continued)

(51) Int. Cl.
*H04B 10/516*  (2013.01)
*H04B 10/69*  (2013.01)
(Continued)

(52) U.S. Cl.
CPC .......... *H04L 1/0045* (2013.01); *H04B 10/40* (2013.01); *H04B 10/516* (2013.01); *H04B 10/69* (2013.01);
(Continued)

(58) Field of Classification Search
None
See application file for complete search history.

(56) References Cited

U.S. PATENT DOCUMENTS 9,414,135 B2 *  8/2016  Patel .................. H04Q 11/0005
10,623,836 B2 *  4/2020  Su ....................... H04Q 11/0062
(Continued)

FOREIGN PATENT DOCUMENTS

CN    101841741 A    9/2010
CN    102511171 A    6/2012
(Continued)

OTHER PUBLICATIONS

ITU-T G.709.1/Y.1331.1(Jan. 2017), Series G: Transmission Systems and Media, Digital Systems and Networks Digital terminal equipments General Series Y: Global Information Infrastructure, Internet Protocol Aspects, Next-Generation Networks, Internet of Things and Smart Cities Internet protocol aspects Transport, Flexible OTN short-reach interface, Jan. 2017, 30 pages.
(Continued)

*Primary Examiner* — Li Liu
(74) *Attorney, Agent, or Firm* — Slater Matsil, LLP

(57) ABSTRACT

A first optical network device groups a plurality of FlexO instance frames into one group, where each of the plurality of FlexO instance frames carries one OTU signal; then, performs multiplexing on the plurality of FlexO instance frames grouped into one group, to generate one first FlexO frame; next, performing scrambling and FEC processing on the first FlexO frame to generate one second FlexO frame and send it to a second optical network device. If a rate of the FlexO instance frame is 100 Gbps and two FlexO instance frames are grouped into one group, the 200 G optical module can be used in the transmission method.

20 Claims, 11 Drawing Sheets

Related U.S. Application Data continuation of application No. PCT/CN2017/110457, filed on Nov. 10, 2017.

(51) Int. Cl.
| | |
|---|---|
| *H04J 14/06* | (2006.01) |
| *H04J 3/16* | (2006.01) |
| *H04L 1/00* | (2006.01) |
| *H04B 10/40* | (2013.01) |
| *H04J 14/08* | (2006.01) |
| *H04Q 11/00* | (2006.01) |

(52) U.S. Cl.
CPC ............ *H04J 3/1652* (2013.01); *H04J 14/08* (2013.01); *H04L 1/0041* (2013.01); *H04Q 11/0062* (2013.01); *H04Q 2011/0086* (2013.01)

(56) References Cited

U.S. PATENT DOCUMENTS

| | | | | |
|---|---|---|---|---|
| 2012/0002671 | A1* | 1/2012 | Xiao | H04J 3/1652 370/389 |
| 2013/0121700 | A1* | 5/2013 | Dong | H04J 3/1652 398/79 |
| 2015/0181316 | A1* | 6/2015 | Patel | H04Q 11/0062 398/45 |
| 2017/0005742 | A1* | 1/2017 | Gareau | H04L 25/49 |
| 2017/0230736 | A1* | 8/2017 | Su | H04Q 11/00 |
| 2018/0102834 | A1* | 4/2018 | Ibach | H04B 10/03 |
| 2018/0183538 | A1 | 6/2018 | Chen et al. | |
| 2019/0098381 | A1* | 3/2019 | Su | H04L 12/413 |

FOREIGN PATENT DOCUMENTS

| | | | |
|---|---|---|---|
| CN | 102893629 | A | 1/2013 |
| CN | 106788855 | A | 5/2017 |
| JP | 2018019224 | A * | 2/2018 |
| JP | 2018019224 | A | 2/2018 |

OTHER PUBLICATIONS

Tomoo Takahara et al., Discussion of 400GbE DMT level diagram for realistic implementation, IEEE802.3 Ottawa Interim meeting Sep. 2014, 16 pages.

\* cited by examiner

201. Group a plurality of FlexO instance frames into one group, where each of the plurality of FlexO instance frames carries one OTU signal 202. Perform interleave-multiplexing on the FlexO instance frames grouped into one group, to generate one first FlexO frame 203. Generate one second FlexO frame after scrambling and error correction coding are performed on the first FlexO frame 204. Send the second FlexO frame

FIG. 3A

METHOD AND APPARATUS FOR TRANSMITTING OPTICAL TRANSPORT UNIT SIGNAL

CROSS-REFERENCE TO RELATED APPLICATIONS

This application is a continuation of U.S. patent application Ser. No. 16/867,205, filed on May 5, 2020, which is a continuation of International Application No. PCT/CN2017/110457, filed on Nov. 10, 2017. All of the afore-mentioned patent applications are hereby incorporated by reference in their entireties.

TECHNICAL FIELD

This application relates to the optical communications field, and in particular, to a high-speed interface transmission technology in an optical network.

BACKGROUND

An optical transport network (OTN) has rich operation, administration, and maintenance (OAM) capabilities, a strong tandem connection monitoring (TCM) capability, and an out-of-band forward error correction (FEC) capability, and can flexibly schedule and manage a large-capacity service.

As service traffic increases and diversifies, the OTN having a fixed-rate interface already cannot meet an interconnection requirement. Currently, the International Telecommunication Union-Telecommunication Standardization Sector (ITU-T) is developing an n*100 G flexible optical transport network (FlexO) interface standard. The interface standard provides a flexible-rate interface by using n 100 G optical modules. The flexible-rate interface carries an optical transport unit n (OTUCn) signal, to implement an interconnection between OTUCn signals on an inter-domain interface. An n*100 G FlexO interface includes n 100 G FlexO signals. A rate of each FlexO signal is equal to a rate of an OTU4. In this way, each FlexO signal may be directly sent by using a standard, low-cost, 100 G optical module (such as a CFP4 or a QSFP28). To carry the OTUCn signal, an OTUCn signal is first divided into n OTUC signals. Then, each OTUC signal (such as an OTUC #1, . . . , or #n) is synchronously mapped to a payload area of each FlexO data frame (such as a FlexO frame #1, . . . , or #n) respectively. Physical lane identifier (PID) overheads carried by the FlexO data frame are used to indicate a location of one FlexO signal on the n*100 G FlexO interface. Correspondingly, a location, which is in the OTUCn, of one OTUC client signal carried by the FlexO data frame may be learned of based on the PID information.

A disadvantage in the current system is that n FlexO frames correspond to n 100 G optical modules respectively and a higher-rate optical transceiver module (such as a 200 G or 400 G optical module to be commercially used) cannot be used.

SUMMARY

Embodiments of the present invention describes an apparatus, a method, and a system for transmitting an optical transport unit signal, to carry the signal by using a high-rate optical transceiver module (such as a 200 G optical module or a 400 G optical module). A technology described in embodiments of the present invention decreases network costs and increases network capacity.

According to a first aspect, an embodiment of the present invention provides a method for transmitting an optical transport unit (OTU) signal. The method includes: mapping n 100 G OTU signals to n 100 G FlexO instance frames respectively; performing multiplexing the n 100 G FlexO instance frames in a unit of every t FlexO instance frames, to generate m first FlexO frames, where both n and t are greater than or equal to 2, m is greater than or equal to n/t, and n, m, and t are all positive integers, wherein each of the m first FlexO frames comprises multiple interleaved FlexO instance frames; generating m second FlexO frames after performing scrambling and forward error correction (FEC) coding on the m first FlexO frames; and sending the m second FlexO frames.

The foregoing steps are performed by an OTN device used as an OTU signal transmitting end.

In a possible implementation, the multiplexing is performed based on 10 bits. This can avoid a bit error spread, so that a transmission capability of a network is improved.

In a possible implementation, t is equal to 2, indicating that every two FlexO instance frames of the n 100 G FlexO instance frames are grouped into one group, and multiplexing is then performed in the group. A rate of the second FlexO frame obtained by using this grouping method is 200 Gbps, and data transmission may be performed by using an optical module having a rate of 200 Gbps.

In another possible implementation, t is equal to 4, indicating that every four FlexO instance frames of the n 100 G FlexO instance frames are grouped into one group, and multiplexing is then performed in the group. A rate of the second FlexO frame obtained by using this grouping method is 400 Gbps, and data transmission may be performed by using an optical module having a rate of 400 Gbps.

In a possible implementation, the generating m second FlexO frames after performing scrambling and FEC coding on the m first FlexO frames specifically includes the following steps: after scrambling the m first FlexO frames, inserting frame header indication information, to generate m third FlexO frames; dividing each FlexO frame of the m third FlexO frames into two other FlexO instance frames, and performing FEC coding processing on each of the two other FlexO instance frames; and multiplexing, by a first optical network device into one second FlexO frame, the two other FlexO instance frames on which FEC coding is performed, where there are m second FlexO frames.

According to a second aspect, an embodiment of the present invention provides a method for transmitting an optical transport unit (OTU) signal. The method includes: receiving m first FlexO frames; generating m second FlexO frames after performing FEC decoding processing and descrambling on the m first FlexO frames; demultiplexing on each of the m second FlexO frames to generate a maximum oft 100 G FlexO instance frames, wherein each of the m second FlexO frames comprises multiple interleaved 100 G FlexO instance frames and the m second FlexO frames generate n 100 G FlexO instance frames in total, both n and t are greater than or equal to 2, m is greater than or equal to n/t, and n, m, and t are all positive integers; and demapping n 100 G OTU signals from the n 100 G FlexO instance frames.

The foregoing steps are executed by an OTN device that receives a FlexO frame carrying an OTU signal.

In a possible implementation, the demultiplexing is performed based on 10 bits.

In a possible implementation, t=2, and a rate of each FlexO frame of the m first FlexO frames is approximately 200 Gbps, so that data can be received by using an optical module having a rate of 200 Gbps.

In another possible implementation, t=4, and a rate of each FlexO frame of the m first FlexO frames is approximately 400 Gbps, so that data can be received by using an optical module having a rate of 400 Gbps.

In a possible implementation, the generating m second FlexO frames after performing FEC decoding processing and descrambling on the m first FlexO frames specifically includes the following steps: dividing, by a first optical network device, each FlexO frame of the m first FlexO frames into two other FlexO instance frames, and performing FEC decoding on each of the two other FlexO instance frames; multiplexing, by the first optical network device into one third FlexO frame, the two other FlexO instance frames on which FEC decoding is performed, where there are m third FlexO frames; and generating, by the first optical network device, the m second FlexO frames after descrambling the m third FlexO frames.

In a possible implementation, the method further includes: identifying, by the first optical network device based on frame header indication information, the m first FlexO frames and logical channel information included in the m first FlexO frames, and obtaining the m first FlexO frames.

According to a third aspect, an embodiment of the present invention further provides an optical network device, where the device includes a processor and a transceiver, where the transceiver is configured to execute the sending operations mentioned in the possible implementations of the first aspect, and the processor is configured to execute other operations mentioned in the possible implementations of the first aspect.

According to a fourth aspect, an embodiment of the present invention further provides an optical network device. The device includes a processor and a transceiver, where the transceiver is configured to execute the receiving operations mentioned in the possible implementations of the second aspect, and the processor is configured to execute other operations mentioned in the possible implementations of the second aspect.

According to a fifth aspect, an embodiment of the present invention provides a data processing apparatus, where the data processing apparatus is located in an OTN device, and the data processing apparatus includes a processor and an interface, where the processor is configured to perform the steps related to frame processing mentioned in the possible implementations of the third aspect, or the steps related to frame processing mentioned in the possible implementation of the fourth aspect; and the interface is configured to: send, by using an optical module, a data frame processed by the processor, or receive a data frame, so that the processor processes the data frame.

According to a sixth aspect, an embodiment of the present invention further provides a system, where the system includes the network device mentioned in any implementation of the third aspect and the network device mentioned in any implementation of the fourth aspect.

According to a seventh aspect, an embodiment of the present invention provides a computer storage medium, including an instruction, where when the instruction is run on a computer, the computer performs the method in any implementation of the first aspect or the second aspect.

In the solutions provided in the embodiments of the present invention, in the foregoing method, the OTU signal (or an OTUCn signal or an OTUC signal) may be carried in a FlexO frame having a rate higher than 100 G and is transmitted by using a high-rate optical module (such as the 200 G or 400 G optical module). Compared with an existing method in which a low-rate optical module is used, in the method provided in the present invention, the high-rate optical module can be directly used, so that network costs can be reduced and network capacity can be increased.

BRIEF DESCRIPTION OF THE DRAWINGS

The following describes in more details the embodiments of the present invention with reference to accompanying drawings.

FIG. 3A is a schematic diagram of a possible procedure of sending an optical transport unit signal;

DETAILED DESCRIPTION OF ILLUSTRATIVE EMBODIMENTS

A network architecture and a service scenario that are described in embodiments of the present invention are intended to describe technical solutions of the embodiments of the present invention more clearly, and do not constitute a limitation on the technical solutions provided in the embodiments of the present invention. A person of ordinary skill in the art can understand that, as the network architecture evolves and a new service scenario appears, the technical solutions provided in the embodiments of the present invention are also applicable to a similar technical problem.

The embodiments of the present invention are applicable to an optical network, for example, an OTN. One OTN is usually formed through connection by a plurality of devices by using an optical fiber, and different topology types, such as a linear topology, a ring topology, and a mesh topology, may be included based on a specific requirement. An OTN shown in FIG. 1 includes two OTNs. Each OTN network includes a quantity of OTN devices. Based on an actual requirement, one OTN device may have different functions. Generally, OTN devices are classified into an optical layer device, an electronic layer device, and a photoelectronic mixing device. The optical layer device is a device capable of processing an optical signal, for example, an optical amplifier (OA) or an optical add/drop multiplexer (OADM). The OA may also be referred to as an optical line amplifier (OLA), and is mainly configured to amplify an optical signal, to support a longer transmission distance while ensuring specific performance of the optical signal. The OADM is configured to perform space conversion on an optical signal, so that the optical signal may be output from different output ports (also referred to as directions sometimes). Based on different capabilities, OADMs may be classified into a fixed OADM (FOADM), a reconfigurable OADM (ROADM), and the like. The electronic layer device is a device capable of processing an electrical signal, for example, a device capable of processing an optical data unit (ODU) signal. The photoelectronic mixing device is a device capable of processing an optical signal and an electrical signal. It should be noted that, based on a specific integration requirement, one OTN device may integrate a plurality of different functions. Technical solutions provided in embodiments of the present invention are applicable to OTN devices in different forms and at different integration levels.

Figure 2:
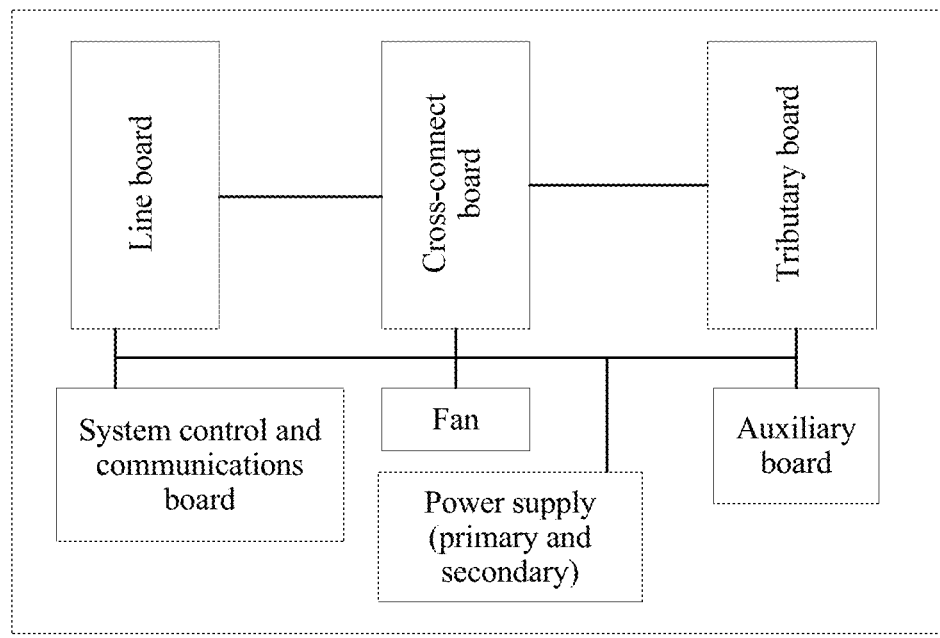
FIG. 2 is a schematic diagram of a possible hardware structure of an optical transport network device.

FIG. 2 is a diagram of a hardware structure of an OTN device. Specifically, the OTN device includes a power supply, a fan, and an auxiliary board, and may further include a tributary board, a line board, a cross-connecting board, an optical processing board, and a system control and communications board. It should be noted that each device may specifically include different types of and a different quantity of boards based on a specific requirement. For example, a network device serving as a core node may have no tributary board. A network device serving as an edge node may have a plurality of tributary boards. The power supply is configured to supply power to the OTN device, and may include a primary power supply and a secondary power supply. The fan is configured to dissipate heat of the device. The auxiliary board is configured to provide an auxiliary function, such as providing an external alarm or accessing an external clock. The tributary board, the cross-connect board, and the line board are mainly configured to process an electrical signal (subsequently referred to as an ODU signal, an OTN frame, or an ODU data frame) of an OTN. The tributary board is configured to receive and send various client services, such as an SDH service, a packet service, an Ethernet service, and a forward service. Further, the tributary board may be divided into a client-side optical module and a signal processor. The client-side optical module may be an optical transceiver, configured to receive and/or send a client signal. The signal processor is configured to: map the client signal to the ODU frame and demap the client signal from the ODU frame. The cross-connect board is configured to exchange ODU frames, so as to exchange ODU signals of one or more types. The line board mainly processes a line-side ODU frame. Specifically, the line board may be divided into a line-side optical module and a signal processor. The line-side optical module may be a line-side optical transceiver, configured to receive and/or send an ODU signal. The signal processor is configured to: multiplex and demultiplex the ODU frame on the line side, or map and demap the ODU frame on the line side. The system control and communications board is configured to implement system control and communication. Specifically, the system control and communications board may collect information from different boards by using a backplane or send a control instruction to a corresponding board. It should be noted that, unless otherwise specified, there may be one or more specific components (for example, a signal processor). This is not limited in the present invention. It should be further noted that, a type of a board included in the device, a specific function design of the board, and a quantity of boards are not limited in the embodiments of the present invention.

On an electrical layer, the OTN frame processed by the OTN device may use a frame format defined by the International Telecommunication Union-Telecommunication Standardization Sector (ITU-T), such as the G.709 standard or the G.709.1 standard, to implement communication between devices. An OTN standard defines OTN frames of different types, such as an optical transport unit k (OTUk) frame, an n*100 G optical transport unit (OTUCn) frame, and a flexible OTN interface (FlexO) frame. The OTN frame mentioned in this application is the OTUCn frame and the FlexO frame. Currently, the FlexO frame is mainly used on an inter-domain link, and the OTUCn frame is used to support an intra-domain link having a rate higher than 100 Gigabits per second (Gbps or G for short). For example, a link between N3 and N6 shown in FIG. 1 may use the FlexO frame, and another link uses the OTUCn frame. That is, to transfer service data between two domains, the devices N3 and N6 need to support mapping of an intra-domain OTUCn frame to the FlexO frame, to perform inter-domain transmission. It should be noted that, as a technology develops, the FlexO frame may also be used on an intra-domain link, such as N1-N2. Whether a link on which the FlexO frame is used is an intra-domain link or an inter-domain link is not limited in the present invention.

To use a higher-rate optical module, for example, a 200 G optical module, embodiments of the present invention provide a new transmission technology. In the method, low-rate OTN data frames are grouped, and interleave-multiplexing is performed on OTN data frames in each group, to obtain another data frame matching the high-rate optical module, so that the another data frame can be sent to another network device by using the higher-rate optical module. It should be noted that, the optical module mentioned in embodiments of the present invention is an optical module capable of receiving and sending an OTN data frame. FIG. 3A shows specific steps with a sending device used as an example.

In a part 201, a plurality of FlexO instance frames are grouped into one group, where each of the plurality of FlexO instance frames carries one OTU signal; in a part 202, multiplexing is performed on the FlexO instance frames grouped into one group, to generate one first FlexO frame, wherein the first FlexO frame comprises multiple interleaved FlexO instance frames; in a part 203, one second FlexO frame is generated after scrambling and error correction coding processing are performed on the first FlexO frame; and in a part 204, the second FlexO frame is sent.

The data frame is scrambled to avoid appearance of continuous values being zeros or ones in the data frame, so that a receiving device may correctly extract clock information in the data frame. Error correction coding processing is performed on the data frame, so that a receiving end may determine, based on added error correction data, whether an error occurs in original data in the data frame in a transmission process, and even correct an incorrect bit. For example, FEC coding is used. The foregoing steps are further described below with reference to more accompanying drawings.

Figure 1:
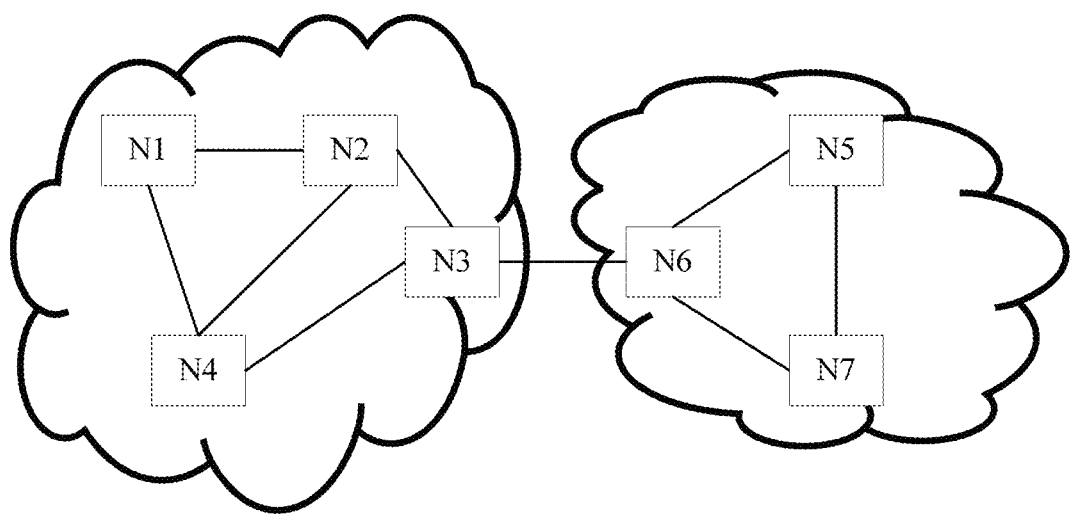
FIG. 1 is a schematic diagram of a possible application scenario of an embodiment of the present invention.
Figure 3B:
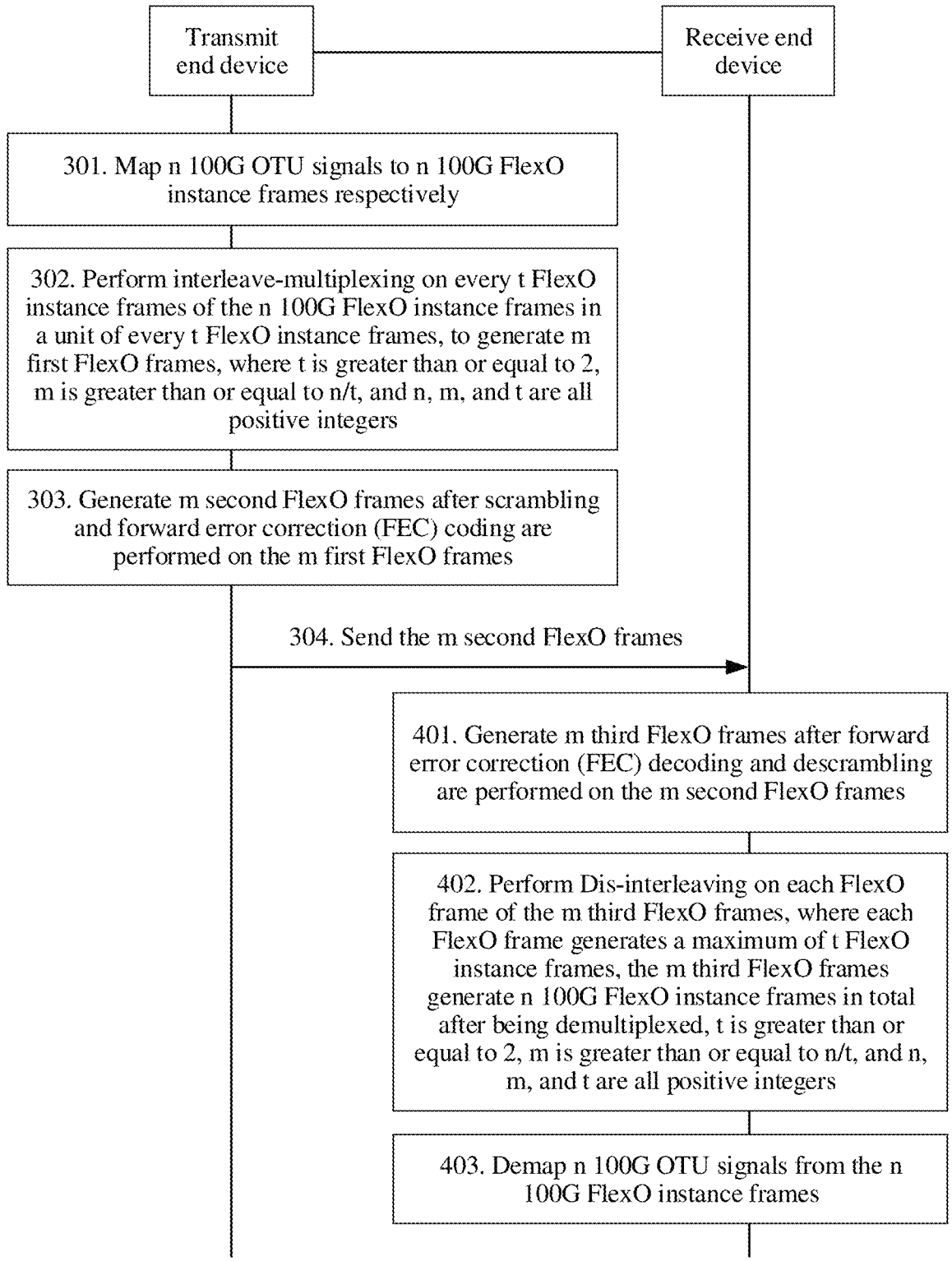
FIG. 3B is a schematic diagram of a possible procedure of transmitting an optical transport unit signal.

FIG. 3B shows a process of transferring an OTUCn signal between two OTN devices by using FlexO frames of different sizes. For example, N3 shown in FIG. 1 is used as a sending device and N6 is used as a receiving device. Alternatively, N6 and N3 are respectively a sending device and a receiving device. Steps shown in FIG. 3B are specifically described as follows.

A transmitting end device performs the following operations.

In a part 301, n 100 G OTU signals are mapped to n 100 G FlexO instance frames respectively.

It should be noted that, the OTU signal, the FlexO instance frame, a first FlexO frame mentioned later, and the like are some intermediate signals (or intermediate frames) used to describe a process of mapping an OTUCn signal to a FlexO frame. Without loss of generality, one type of signal corresponds to at least one frame format, and one frame format is a specific expression of one signal. Unless otherwise specified, a signal and a frame can be interchangeably used in embodiments of the present invention. In the part 301, an OTU frame and the FlexO instance frame are in a relationship of including and being included, for differentiation, the former is referred to as a signal. The OTU frame may include client data of a size, and the FlexO instance frame and various frames mentioned later are intended to carry the client data. Therefore, the FlexO instance frame and the frames mentioned later are collectively referred to as frames instead of signals. Essentially, the OTU signal also corresponds to a frame format. It should be further noted that, a rate of the OTUCn signal or a rate of an OTUCn frame is approximately n*100 G, and a rate of the foregoing mentioned OTU signal is approximately 100 G. Therefore, it may be understood that n*100 G OTU signals are formed by dividing the OTUCn signal. A specific division method is not limited in the present invention. For example, n OTUC subframes of one OTUCn frame may be directly divided, to form the n OTU signals/OTU frames. In addition, a rate of the FlexO instance frame is similar to the rate of the OTU signal. For an example of a specific frame structure, refer to FIG. 5 and related text descriptions in Embodiment 1. Details are not described herein. In addition, because the rate of the OTU signal is 100 Gbps, the signal may also be referred to as an OTUC signal, and C denotes 100 G.

In a part 302, after multiplexing is performed on the n 100 G FlexO instance frames in a unit of every t FlexO instance frames, m first FlexO frames are generated, where both n and t are greater than or equal to 2, m is greater than or equal to n/t, and n, m, and t are all positive integers, wherein each of the m first FlexO frames comprises multiple interleaved FlexO instance frames.

The being in the unit of every t FlexO instance frames is to group n FlexO instance frames, and one group includes t or a maximum oft FlexO instance frames. A grouping method may be to sequentially select t FlexO instance frames from the n FlexO instance frames as a group. There is another alternative grouping method. This is not limited in the present invention. Then, multiplexing is performed in a unit of one group to form a first FlexO frame. That is, one first FlexO frame is generated after multiplexing is performed on the maximum of t FlexO instance frames. If there are m groups in total after the FlexO instance frames are grouped, the m first FlexO frames may be formed after multiplexing is performed. Performing multiplexing on the t FlexO instance frames is to successively take some data from each instance frame to form a new frame, until all data of each instance frame is placed in the new frame (also referred to as interleave-multiplexing in this application).

The quantity t of FlexO instance frames included in one group depends on a rate of an optical module and the rate of the FlexO instance frame carrying the OTU signal. If the rate of the instance frame is 100 Gbps, and the rate of the optical module is 200 Gbps, 300 Gbps, or 400 Gbps, values oft are respectively 2, 3, and 4. For specific values oft, m, and n, refer to subsequent Embodiment 1 and Embodiment 2. Details are not described herein. It should be noted that, a current FlexO instance frame carries one OTU signal, and rates of the two frames are basically the same, that is, 100 Gbps. A rate of an optical module that is currently being developed is 200 G or 400 G. These rates are used as examples in a plurality of subsequent embodiments. However, with research and development of related technologies, solutions provided in embodiments of the present invention are also applicable to a FlexO instance frame having another rate and an optical module having a different rate.

It should be noted that a granularity of bit interleave-multiplexing may be a granularity of r*10 bits. Specifically, the interleaving granularity may be 10 bits, 20 bits, or the like. In this way, a bit error spread may be prevented from occurring in the first FlexO frame in a transmission process, and a transmission capability is enhanced. To be specific, if a data transmission problem (for example, information is incorrectly transferred) of 10 bits or of less than 10 bits occurs in the first FlexO frame in a transmission process, using an example in which a basic data unit used in FEC coding is 10 bits, compared with a smaller granularity (for example, one bit is used) of interleave-multiplexing, a 10-bit granularity of interleave-multiplexing causes the data transmission problem to usually affect only one FlexO instance frame and an OTU signal carried by the one FlexO instance frame. This reduces a probability that the bit error problem spreads to a plurality of other FlexO instance frames and OTU signals carried by the plurality of other FlexO instance frames, so as to avoid the bit error spread. It should be further noted that m may be limited to a positive integer less than (n/t)+1.

In a part 303, m second FlexO frames are generated after scrambling and FEC coding processing are performed on the m first FlexO frames.

For a specific scrambling method and a specific FEC coding method, refer to Embodiment 1 and Embodiment 2. Details are not described herein.

In a part 304, the m second FlexO frames are sent.

Specifically, the transmitting end device sends the m second FlexO frames to a receiving end. For example, N3 sends, to N6, the FlexO frame carrying a client signal. It should be noted that each of the m second FlexO frames has a complete frame structure. Each of the second FlexO frames may be transmitted in an optical fiber by using one optical module.

A receiving end device performs the following operations.

In the part 304/ the receiving end device, as the receiving end, receives the m second FlexO frames.

Specifically, the receiving end device obtains the m second FlexO frame by using m optical modules.

In a part 401, m third FlexO frames are generated after FEC decoding processing and descrambling are performed on the m second FlexO frames.

Similar to the part 303, for a specific descrambling method and a specific FEC decoding method, refer to Embodiment 1 and Embodiment 2. Details are not described herein.

In a part 402, demultiplexing is performed on each FlexO frame of the m third FlexO frames, where each FlexO frame generates a maximum oft FlexO instance frames, each of the FlexO frame comprises multiple interleaved FlexO instance frames, the m third FlexO frames generate n 100 G FlexO instance frames in total after being demultiplexed, both n and t are greater than or equal to 2, m is greater than or equal to n/t, and n, m, and t are all positive integers.

This step is an inverse process of the part 302. That is, the maximum oft FlexO instance frames are obtained by demultiplexing one third FlexO frame. A specific quantity of FlexO instance frames that are actually obtained depends on a specific application scenario. Refer to examples in Embodiment 1 and Embodiment 2.

In a part 403, n 100 G OTU signals are demapped from the n 100 G FlexO instance frames.

This step is an inverse process of the step part 301. That is, the OTU signals are obtained from the FlexO instance frames. Details are not described herein. If the n OTU signals need to be recovered to an OTUCn signal, the n OTU signals may be combined into one OTUCn signal based on an OTUCn frame structure.

In the foregoing method, the OTN device may carry the OTU signal (or an OTUCn signal or an OTUC signal) in a FlexO frame having a rate higher than 100 G and transmit the OTU signal by using a high-rate optical module (such as a 200 G or 400 G optical module). Compared with a method in which a low-rate optical module is used, in the method provided in embodiments of the present invention, network costs can be reduced and a network capacity can be increased. Specifically, a price per Gbps of the high-rate optical module is slightly less than that of the relatively low-rate optical module. Therefore, using the high-rate optical module can reduce more network costs. In addition, because optical spectrum resources that can be used by one optical fiber is limited, when optical spectra of a same size are occupied, overall optical fiber transmission bandwidth can be improved by increasing a rate of a single optical module. That is, the network capacity can be increased.

The embodiments of the present invention are further described below in detail based on common aspects of OTU signal transmission described above in embodiments of the present invention. It should be noted that terms "first", "second", and the like in various parts (including the general overview and the embodiments) of embodiments of the present invention are used to distinguish similar objects, but do not necessarily describe a specific order. It should be understood that terms used in this way may be exchanged in a proper case, so that the embodiments described can be implemented in an order different from that illustrated or described herein.

Embodiment 1

An embodiment of the present invention provides a method, an apparatus, and a system for processing an OTU signal. In this embodiment, a rate of a FlexO frame is 200 Gbps. Using a network scenario in FIG. 1 as an example, it is assumed that a transmitting end device in this embodiment is N3, and a receiving end device is N6. It should be noted that N3 and N6 are only examples, and may be replaced with two other devices.

Figure 4:
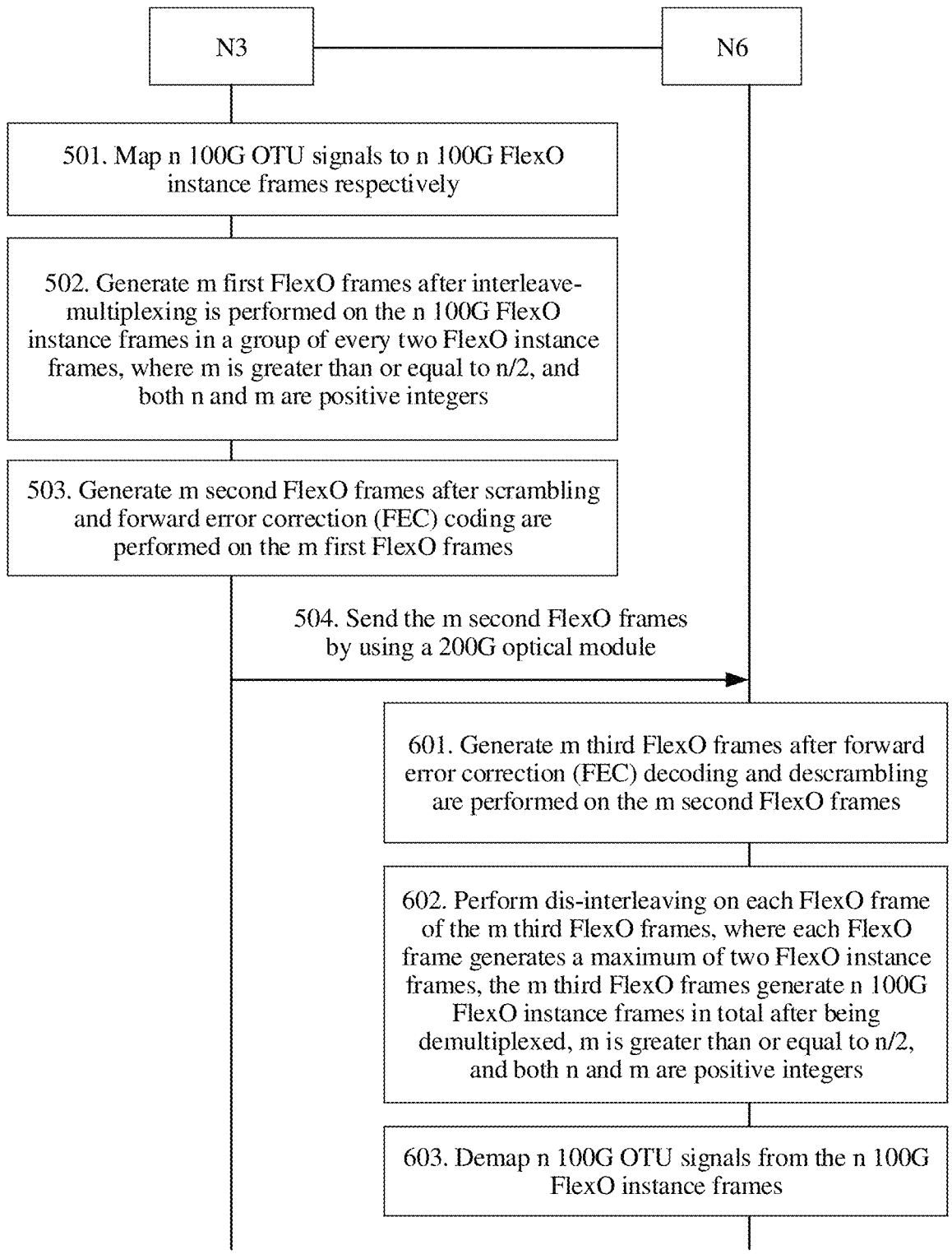
FIG. 4 is a schematic diagram of another possible procedure of transmitting an optical transport unit signal.

FIG. 4 shows steps that need to be performed by N3 and N6 for processing an OTU signal, and descriptions are as follows.

N3 performs the following steps.

In a part 501, n 100 G OTU signals are mapped to n 100 G FlexO instance frames respectively.

Figure 5:
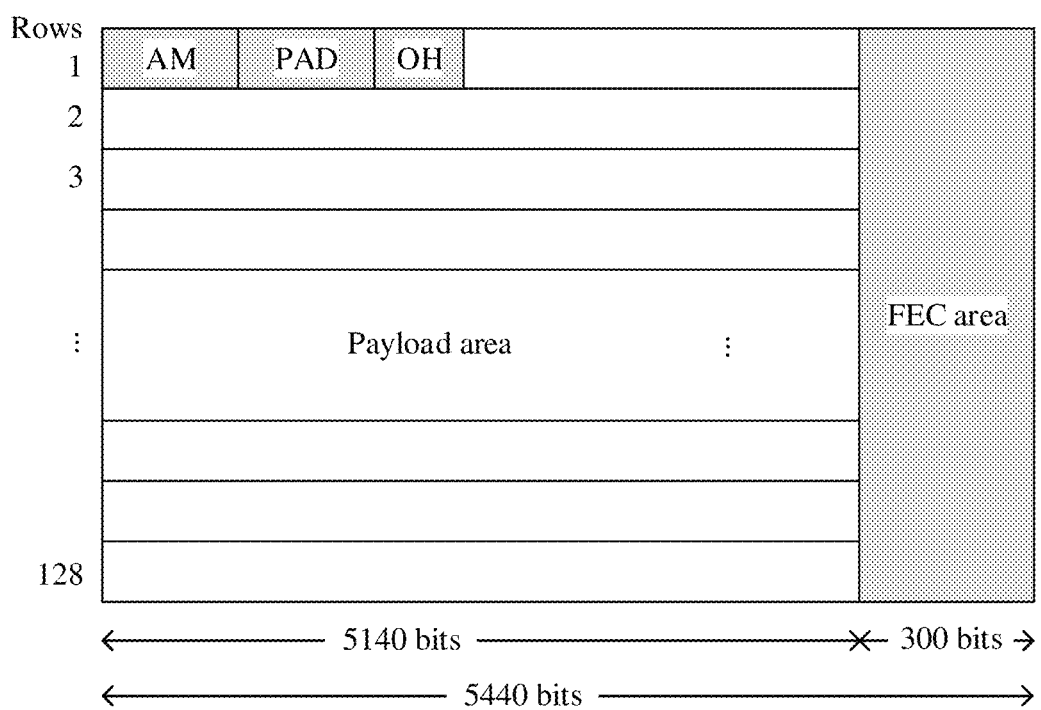
FIG. 5 is a schematic diagram of a possible structure of a 100 G FlexO instance frame.

This step is similar to the part 301 in FIG. 3B. For detailed descriptions, refer to the related descriptions of the part 301. Details are not described herein again. It should be noted that, a frame format corresponding to the OTU signal may also be referred to as an OTU instance frame, and is a frame structure generated in a process of mapping an OTUCn signal to a FlexO frame. FIG. 5 is a schematic diagram of a structure of a FlexO instance frame. A size of the FlexO instance frame is 128*5440 bits (bit), where 128 is a quantity of rows of the frame structure, and 5440 is a quantity of bits included in one row. That is, each row includes 5440 columns, and a width of each column is one bit. Specifically, the frame includes an alignment marker (AM) area, a pad (PAD) information area, an overhead (OH) area, a payload (Payload) area, and an FEC area. AM information is used to mark a starting location of the frame (or a subframe, or the frame and a subframe). The pad area is fixedly padded and can be reserved for a further function extension. The payload area is used to carry a client signal. The FEC area is used to store FEC coding information. Each area has a size. For example, the FEC area occupies 300 bits in each row of the frame. It should be noted that areas included in related process frames (for example, a FlexO instance frame and another subsequently mentioned FlexO instance frame) are similar. However, depending on different execution steps, the areas or information included in the process frames may be different. That is, some areas are optional, or some areas are not padded with useful data (or information). For example, in this step, the FlexO instance frame may not include the FEC area. The FEC area is added in a subsequent step. For another example, in the current step, the FlexO instance frame includes the AM area, but the area includes no valid information.

It should be finally noted that, in this step, the n 100 G OTU signals (for example, an OTU 1, an OTU 2, . . . , and an OTU n) are respectively placed in payload areas of the n FlexO instance frames. For example, the OTU 1 is placed in a payload area of a FlexO frame 1, and an OTU 2 is placed in a payload area of a FlexO frame 2. The rest OTU signals are placed in a same manner.

In a part 502, m first FlexO frames are generated after interleave-multiplexing is performed on the n 100 G FlexO instance frames in a group of every two FlexO instance frames, where m is greater than or equal to n/2, and both n and m are positive integers.

This step is similar to step 302 in FIG. 3B. For specific explanations, refer to the descriptions of the part 302. Details are not described herein again. A main difference is that t=2 in this embodiment. That is, after interleave-multiplexing is performed in a unit of two FlexO instance frames, one first FlexO frame is formed. That is, one first FlexO frame includes two FlexO instance frames.

Using an example in which there are five FlexO instance frames, the five FlexO instance frames may be grouped into three groups, where each group includes two FlexO instance frames, and a last group includes only one FlexO instance frame. In this case, one unequipped FlexO instance frame may be further constructed and added to the last group. The unequipped FlexO instance frame is indicated by carrying one identifier overhead, for example, a GID (group identifier), in an overhead area of the unequipped FlexO instance frame. To be specific, GID information carried by the frame is set to all zeros, used to indicate that the FlexO instance frame corresponding to the GID information carries no valid OTU signal. That is, the frame is an unequipped FlexO instance frame. After interleave-multiplexing is performed, three first FlexO frames are formed in total. If ten FlexO instance frames are used as an example, there are five groups, and five first FlexO frames may be generated in total.

Figure 6:
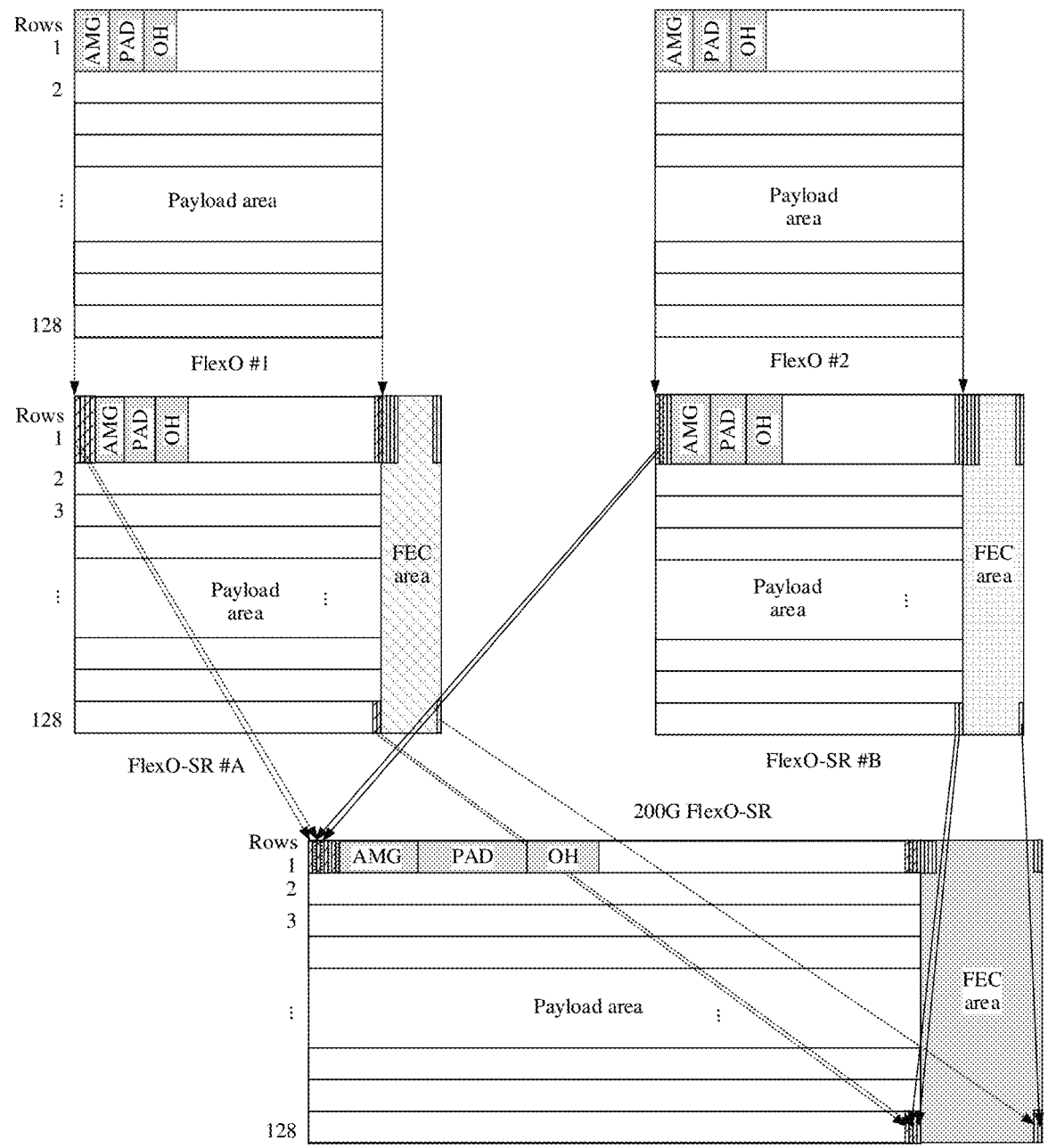
FIG. 6 is a schematic diagram of a possible interleave-multiplexing process of two FlexO instance frames.

To explain this step more clearly, FIG. 6 provides a schematic flowchart based on an example of two FlexO instance frames.

In FIG. 6, a FlexO #1 and a FlexO #2 are two FlexO instance frames. For differentiation, the two frames are respectively numbered 1 and 2. It should be noted that the two FlexO instance frames have no FEC areas. A FlexO-SR #1 and a FlexO-SR #2 are two FlexO instance frames to which FEC areas are added. To distinguish from the FlexO instance frames, a suffix -SR (short for Short Range, short range) is added to the two frames. The SR indicates that currently the FlexO frame is mainly applied to a short range scenario. However, an application scenario of the FlexO frame is not limited in the present invention, and the suffix SR is only used to distinguish the different FlexO frames. In addition, a 200 G FlexO-SR in FIG. 6 is the first FlexO frame mentioned in the current step. A size of the frame is 128 (rows)*10880 (bits), and a size of each row is twofold a size of one row of one FlexO instance frame. It should be noted that the FEC area is added in the step. However, FEC coding processing is not performed, and only preparations (that is, reserving the area) are made for subsequent coding processing. In addition, the FEC area may not be added in the step, but be added when FEC coding is subsequently performed. A step in which the FEC area is specifically added is not limited in the present invention. It should be further noted that, an AMG (AM group) in the figure is the AM area in FIG. 5, and shows that the AM area can indicate a group of data blocks. For details, refer to an example and related explanations in FIG. 7. Details are not described herein.

As shown in FIG. 6, the step may specifically include the following two steps:

First, an FEC area is separately added to the two FlexO instance frames (in one group). This step is optional.

Then, the two FlexO instance frames (that is, the two FlexO-SR frames) are respectively divided into data blocks in a unit of 10 bits, and a 10-bit block of the FlexO-SR #1 and a 10-bit block of the FlexO-SR #2 are alternately placed in the 200 G FlexO-SR. To be specific, the 200 G FlexO-SR includes a first 10-bit block of the FlexO-SR #1, a first 10-bit block of the FlexO-SR #2, a second 10-bit block of the FlexO-SR #1, a second 10-bit block of the FlexO-SR #2, and the like. It should be noted that, performing interleave-multiplexing based on 10 bits is only an example, and interleave-multiplexing may alternatively be performed based on a multiple of 10 bits.

In a part 503, m second FlexO frames are generated after scrambling and forward error correction (FEC) coding processing are performed on the m first FlexO frames.

Similar to the FlexO instance frame, the first FlexO frame also includes an AM area, a payload area, a pad area, an FEC area, and the like. This step may be specifically subdivided into the following:

First, for each first FlexO frame, the AM area and the FEC area that are in the frame are set to zero.

Then, the entire frame is scrambled. For example, frame synchronization scrambling may be performed on the frame by using a polynomial $x^{16}+x^{12}+x^3+x+1$. It should be noted that the scrambling in embodiments of the present invention may use any scrambling manner that is specified currently or in the future. This is not limited in the present invention.

Subsequently, information about the AM area and FEC information are added to each scrambled first FlexO frame, so as to generate the m second FlexO frames.

Using an example in which a size of the AM area of the first FlexO frame is 960 bits, a process of adding the AM area to the first FlexO frame is further described below. The AM area is used to mark a starting location of the first FlexO frame, and mark each logical channel and a start location of each logical channel after the AM area is divided into a plurality of logical channels. To be specific, the information is added to a FlexO frame sent by a transmitting end, and a receiving end may undoubtedly parse out, by using the information, a first FlexO frame indicated by information about each AM area and a plurality of logical channels that are obtained by dividing the AM area. It should be noted that, the logical channel may be understood as a subframe of the first FlexO frame, and is also a data block structure.

Figure 7:
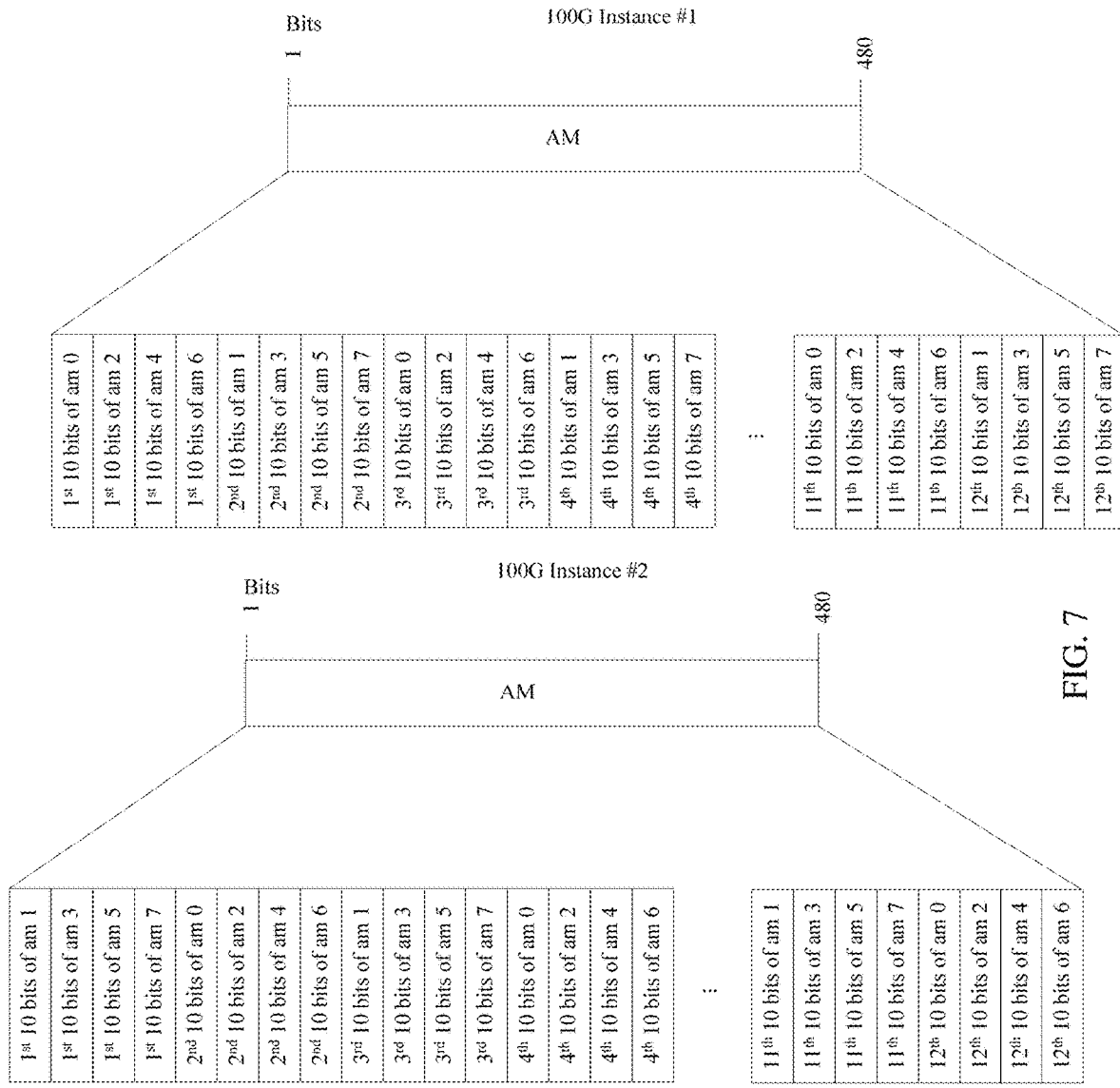
FIG. 7 is a schematic diagram of AM information included in a possible FlexO instance frame.

In this instance, the AM area is divided into eight logical channels, and a size of each channel is 120 bits. The eight logical channels are respectively indicated as an am 0, an am 1, an am 2, an am 3, an am 4, an am 5, an am 6, and an am 7. A possible AM pattern (that is, padded data) is shown in Table 1. It should be noted that, Table 1 shows an example of data padded in the AM area, and an order relationship of two steps of padding the AM area and adding the FEC information is not limited. For example, after the first FlexO frame is scrambled, the AM information may be added before FEC processing is performed. For another example, the AM information may alternatively be added in a process of performing FEC coding. Similar to the AM information of the first FlexO frame, each FlexO instance frame also has a similar structure. FIG. 7 shows an example of AM information included in two FlexO instance frames. As shown in FIG. 7, to support AM logical channels of the first FlexO frame after 10-bit interleaving is performed, AMs included in the two FlexO instance frames (that is, a 100 G instance #1 and a 100 G instance #2 that are in FIG. 7) in step 502 are respectively formed in an order of an am 0, an am 2, an am 4, an am 6, an am 1, an am 3, an am 5, and an am 7 and in an order of an am 1, an am 3, an am 5, an am 7, an am 0, an am 2, an am 4, and an am 6 through interleaving of 10-bit granularity. It should be noted that according to different quantities of ports supported by an optical module, the divided AM logical channels may alternatively be four logical channels, two logical channels, or the like. This is not limited in the present invention.

Functions of a Common Marker x (CMx), Unique Padding y (UPy), and a Unique Marker z (UMz) (x, z=0, 1, 2, 3, 4, or 5, and y=0, 1, or 2) in Table 1 are different. Specifically, the CM is used to identify a FlexO frame in which the CM is located, and a start location of a FlexO frame is identified by detecting all information included in the CMx. The UM is used to uniquely identify a logical channel. The UP is used to avoid appearance of excessively many continuous zeros or continuous ones in data.

TABLE 1

Example of values of a channel am i of an AM area of a 200 G first FlexO frame

| Logical Channel Number | Value Example {CM 0, CM 1, CM 2, UP 0, CM 3, CM 4, CM 5, UP 1, UM 0, UM 1, UM 2, UP 2, UM 3, UM 4, UM 5} | | | | | | | | | | | | | |
|---|---|---|---|---|---|---|---|---|---|---|---|---|---|---|
| am 0 | 59 | 52 | 64 | A0 | A6 | AD | 9B | 6B | CD | 03 | 31 | 94 | 32 | FC CE |
| am 1 | 59 | 52 | 64 | 20 | A6 | AD | 9B | E6 | 5A | 7B | 7e | 19 | A5 | 84 81 |
| am 2 | 59 | 52 | 64 | 62 | A6 | AD | 9B | 7F | 7C | CF | 6A | 80 | 83 | 30 95 |

TABLE 1-continued

Example of values of a channel am i of an AM area of a 200 G first FlexO frame

| Logical Channel Number | Value Example {CM 0, CM 1, CM 2, UP 0, CM 3, CM 4, CM 5, UP 1, UM 0, UM 1, UM 2, UP 2, UM 3, UM 4, UM 5} | | | | | | | | | | | | | | |
|---|---|---|---|---|---|---|---|---|---|---|---|---|---|---|---|
| am 3 | 59 | 52 | 64 | 5A | A6 | AD | 9B | 21 | 61 | 01 | 0B | DE | 9E | FE | F4 |
| am 4 | 59 | 52 | 64 | 87 | A6 | AD | 9B | 98 | 54 | 8A | 4F | 67 | AB | 75 | B0 |
| am 5 | 59 | 52 | 64 | 45 | A6 | AD | 9B | 72 | 48 | F2 | 8B | 8D | B7 | 0D | 74 |
| am 6 | 59 | 52 | 64 | BC | A6 | AD | 9B | 77 | 42 | 39 | 85 | 88 | BD | C6 | 7A |
| am 7 | 59 | 52 | 64 | 44 | A6 | AD | 9B | 4C | 6B | 6E | DA | B3 | 94 | 91 | 25 |

In addition, a manner of adding the FEC information is further described by using a Reed Solomon (Reed Solomon) code RS10 (544, 514). Specifically, each first FlexO frame is divided into two subframes (which may be understood as two FlexO instance frames, and to distinguish from the foregoing mentioned instance frame, the two subframes are referred to as other FlexO instance frames). Then, FEC coding processing is performed on each of the two other FlexO instance frames. For example, FEC coding is performed by using the RS10 (544,514).

Finally, every two other FlexO instance frames to which AM information and FEC information are added are interleave-multiplexed into the second FlexO frame.

In a part 504, the m second FlexO frames are sent by using a 200 G optical module.

This step is similar to step 304 in FIG. 3B. A difference is that this embodiment points out a rate of the to-be-used optical module. Specifically, a rate of one second FlexO frame is approximately 200 Gbps, and one second FlexO frame is sent to an optical fiber by using one 200 G optical module and is transmitted to a destination node, and N6 is an example.

Specifically, after generating the m second FlexO frames in step 503, N3 distributes each second FlexO frame to eight logical channels based on a bit granularity, for example, a 10-bit granularity. An example of a practice of specific distribution is as follows: In a first round, 80-bit data (for example, D0D1D2D3D4D5D6D7, and each D is 10 bits) is polled and distributed to a logical channel 0, a logical channel 1, a logical channel 2, a logical channel 3, a logical channel 4, a logical channel 5, a logical channel 6, and a logical channel 7 in order based on the 10-bit granularity. In a second round, 80-bit data (for example, D0D1D2D3D4D5D6D7, and each D is 10 bits) is polled and distributed to the logical channel 1, the logical channel 0, the logical channel 3, the logical channel 2, the logical channel 5, the logical channel 4, the logical channel 7, and the logical channel 6 in order based on the 10-bit granularity. Afterward, distribution is repeated in order according to a distribution rule of the first round and the second round, until distribution of data of one second FlexO frame is completed. Then, bit multiplexing is performed on the logical channels based on a specific quantity k (k may be 2, 4, or 8) of input ports of the optical module, to form new logical channels whose quantity is equal to k, and the second FlexO frame is sent by using the optical module. For example, using k=4 as an example, the eight logical channels need to be multiplexed into an optical module supporting four input ports. For another example, if k=8, the eight logical channels do not need to be further multiplexed, and the second FlexO frame can be directly sent by using the optical module. It should be noted that, an optical interface supporting a FlexO frame is also referred to as an FOIC interface that is denoted by using FOICt.k. Ct denotes a rate (C corresponds to 100 and represents 100 Gbps, and Ct denotes t 100 Gbps), and k denotes a quantity of logical channels supported by the optical module or the interface. For example, FOIC2.4 denotes that a value of a supported rate is 200 Gbps, there are four logical ports, and a corresponding optical module also has four ingress ports. It can be seen that to adapt to an optical module having different input ports, a quantity of logical channels of one second FlexO frame may be an integer multiple of a quantity of the input ports of the optical module. For example, the integer multiple may be fourfold, twofold, or onefold. Whether logical ports need to be multiplexed for data transmission to a corresponding optical module is determined based on a specific requirement.

N6, as an example of the receiving end device, performs the following steps.

In a part 504, the m second FlexO frames are received by using the 200 G optical module.

Specifically, N6, as the receiving end, receives the m second FlexO frames by using the 200 G optical module. It should be further noted that, this step is an inverse step of step 504 performed by the transmitting end. That is, N6 may need to demultiplex received data and perform data reconstitution to recover the second FlexO frames. Specifically, N6 needs to perform bit demultiplexing on the m second FlexO frames obtained from m FOIC2.ks, to obtain a bit data stream of the logical channels. It should be noted that N6 may identify the corresponding logical channels by using the am i (i=0, 1, . . . , and 7) in the AM area. The logical channels are aligned and rearranged, to obtain each second FlexO frame.

In a part 601, m third FlexO frames are generated after forward error correction (FEC) decoding processing and descrambling are performed on the m second FlexO frames.

Specifically, this step is an inverse process of step 503. Specifically, this step may be subdivided into the following steps:

First, each FlexO frame of the m second FlexO frames is divided into two other FlexO instance frames, and FEC decoding processing is performed on each of the other FlexO instance frames, for example, by using the RS10 (544,514).

Then, the two FlexO instance frames on which FEC decoding processing is performed are multiplexed, to form m fourth FlexO frames.

Finally, the m third FlexO frames are generated after descrambling is performed on the m fourth FlexO frames.

In a part 602, demultiplexing is performed on each FlexO frame of the m third FlexO frames to generate a maximum of two FlexO instance frames, each of the m third FlexO frames comprises multiple interleaved FlexO instance frames and the m third FlexO frames generate n 100 G FlexO instance frames in total after being demultiplexed, m is greater than or equal to n/2, and both n and m are positive integers.

Specifically, this step is an inverse process of step 502, and is also referred to as dis-interleaving in this application. Specifically, bit dis-interleaving, for example, 10-bit dis-interleaving, is performed in this step, so that the m third FlexO frames may be demultiplexed into the n FlexO instance frames, and each FlexO frame is demultiplexed into a maximum of two FlexO instance frames. Using an example in which the transmit end sends three second FlexO frames (including only five FlexO instance frames), the receive end may obtain three third FlexO frames in total, and may parse out five FlexO instance frames. One third FlexO frame is demultiplexed into one FlexO instance frame and one unequipped FlexO instance frame. N6 may identify the unequipped FlexO instance frame by using a GID carried by the FlexO instance frame, and discard the frame. Assuming that the FlexO frame sent by the transmit end includes an even quantity of FlexO instance frames, the FlexO instance frames parsed out by the receive end and the third FlexO instance frames may be multiples to each other, that is, the former is twofold the latter.

In a part 603, n 100 G OTU signals are demapped from the n 100 G FlexO instance frames.

Specifically, in this step, the OTU signals are obtained from payload areas of the FlexO instance frames. A corresponding quantity of OTU signals may be obtained based on a quantity of FlexO instance frames.

In the method for transmitting an OTU signal described in this embodiment of the present invention, a network device may use a higher-rate 200 G optical module, to reduce network costs and increase a network capacity. Optionally, 10-bit interleave-multiplexing is performed, ensuring integrity of FEC processing on an OTU signal, and improving a transmission capability. It should be noted that, interleave-multiplexing of a larger multiple of 10 bits may alternatively be performed to have the foregoing advantageous effects.

Embodiment 2

An embodiment of the present invention provides another method, apparatus, and system for processing an OTU signal. In this embodiment, a rate of a FlexO frame is 400 Gbps. Using a network scenario in FIG. 1 as an example, it is assumed that a transmitting end device in this embodiment is N6, and a receiving end device is N3. It should be noted that N3 and N6 are only examples, and may be replaced with two other random devices.

Figure 8:
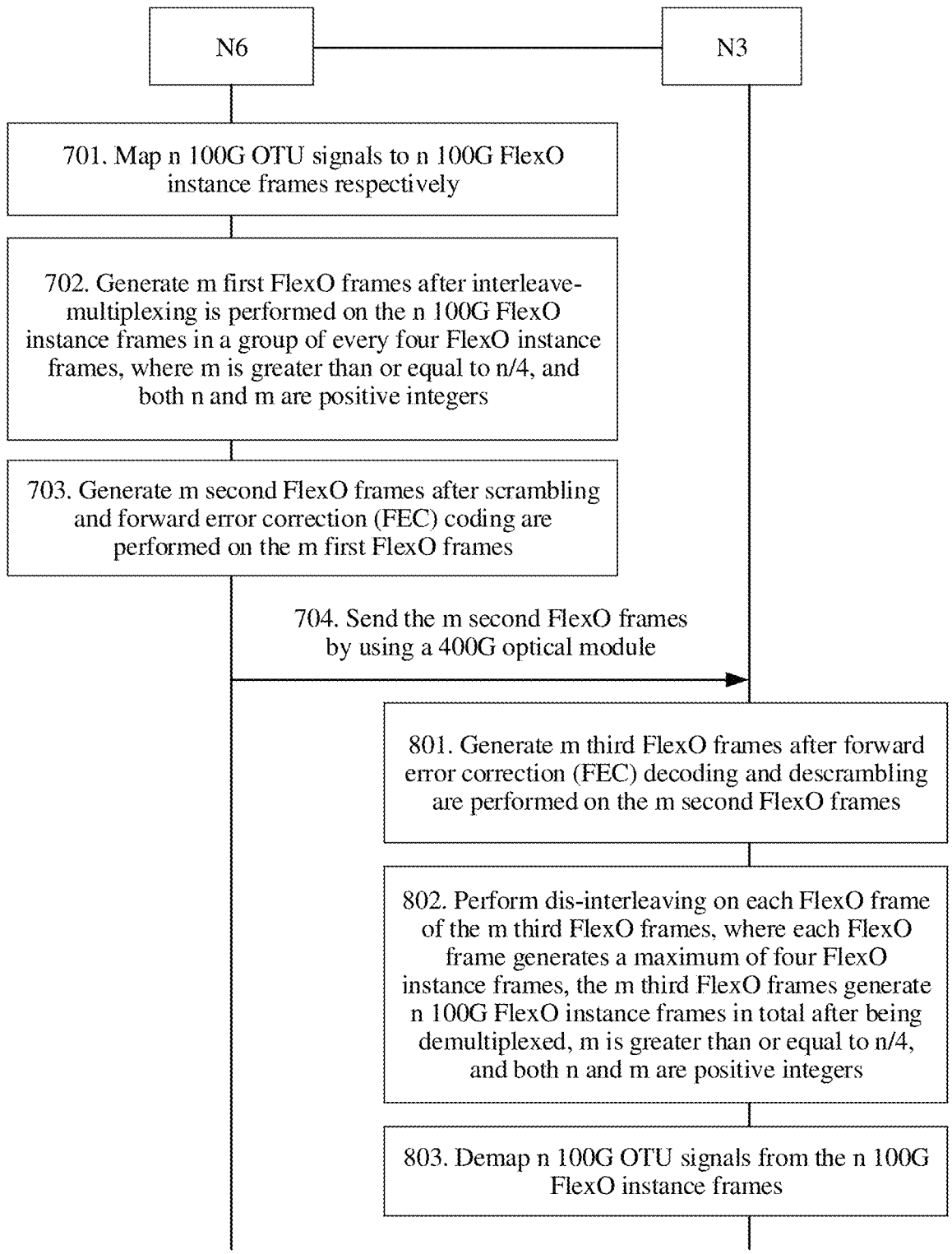
FIG. 8 is a schematic diagram of still another possible procedure of transmitting an optical transport unit signal.

FIG. 8 shows steps needing to be performed by N6 and N3 for processing an OTU signal, and descriptions are as follows.

N6 performs the following steps.

In a part 701, n 100 G OTU signals are mapped to n 100 G FlexO instance frames respectively.

This step is similar to the part 301 in FIG. 3B and the part 501 in FIG. 4. For details, refer to the specific descriptions of the related parts. Details are not described herein again.

In a part 702, m first FlexO frames are generated after interleave-multiplexing is performed on the n 100 G FlexO instance frames in a group of every four FlexO instance frames, where m is greater than or equal to n/4, and both n and m are positive integers.

This step is similar to step 302 in FIG. 3B and the part 502 in FIG. 4. For some explanations and descriptions, refer to the related descriptions. Details are not described herein again. A main difference is that t=4 in this embodiment. That is, four FlexO instance frames are used as a unit to form one first FlexO frame. That is, one first FlexO frame includes four FlexO instance frames.

Figure 9:
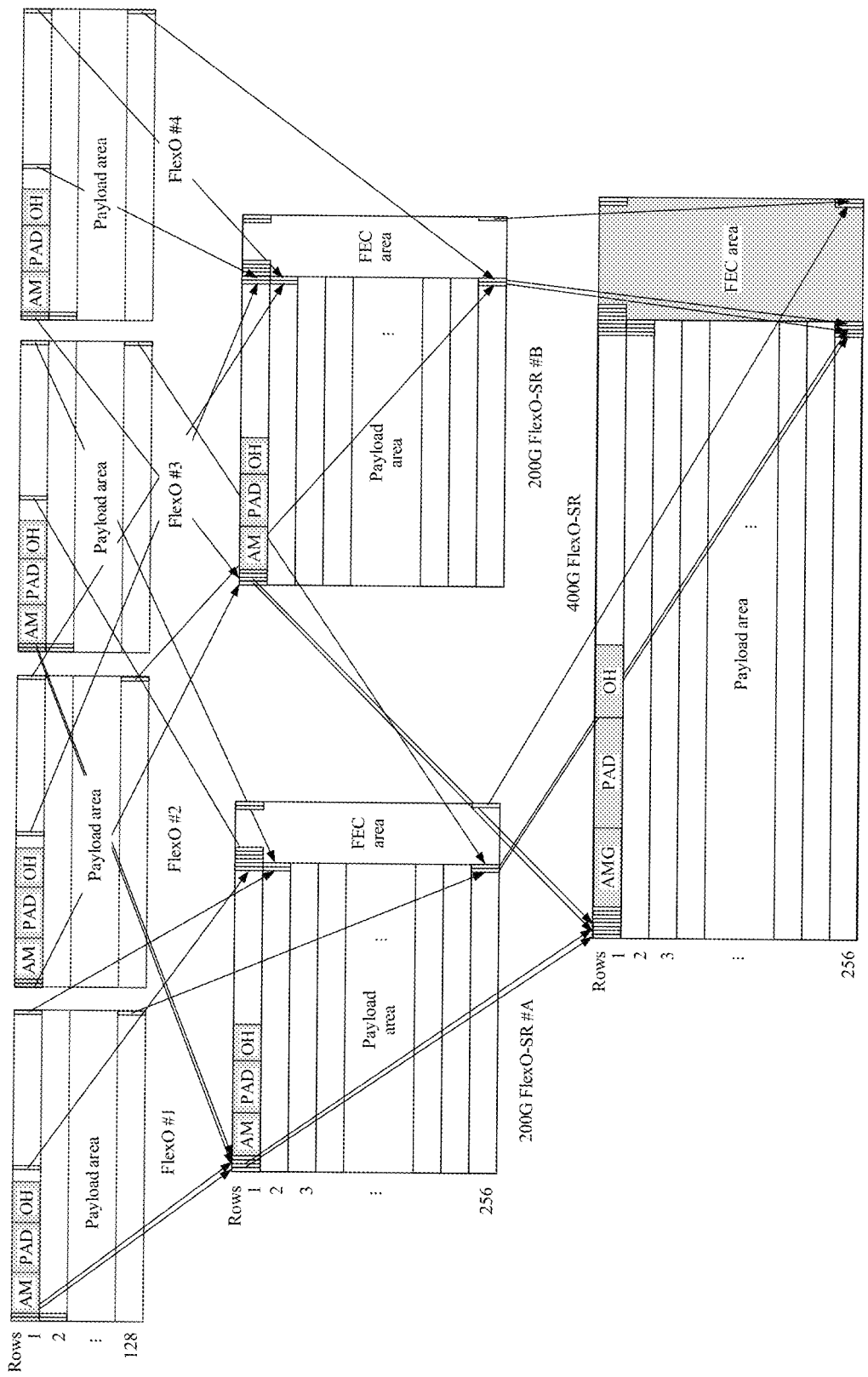
FIG. 9 is a schematic diagram of a possible interleave-multiplexing process of four FlexO instance frames.

To explain this step more clearly, FIG. 9 provides a schematic flowchart of this step based on an example of four FlexO instance frames. In FIG. 9, a FlexO #1, a FlexO #2, a FlexO #3, and a FlexO #4 are four FlexO instance frames. For distinguishing, the four frames are numbered 1 to 4. A FlexO-SR #A and a FlexO-SR #B are two FlexO instance frames to which FEC areas are added. To distinguish from the FlexO instance frames, a suffix -SR is added to the two frames. It should be further noted that, a rate of a FlexO-SR is twofold a rate, that is, 200 Gbps, of each of the FlexO #1 to the FlexO #4. In addition, the 400 G FlexO-SR is the first FlexO frame mentioned in this step. A size of the frame is 256 (rows)*10880 (bits), and a size of each row and a size of each column are twofold a size of a row and a size of a column of one FlexO instance frame. It should be noted that, a quantity of rows of the FlexO-SR in this step is 256, and is consistent with a quantity of rows of the first FlexO frame. In addition, an FEC area is added to the frame. It should be noted that, similar to the descriptions of the part 502, if the FEC area is added, it does not mean that FEC coding is performed, and the area is only reserved for subsequent coding.

As shown in FIG. 9, the step may specifically include the following:

First, every two of the four FlexO instance frames (in one group) are interleave-multiplexed (for example, in a unit of 10 bits) into one FlexO-SR, to form two FlexO-SR frames. As shown in FIG. 9, the FlexO #1 and the FlexO #3 are interleave-multiplexed into the FlexO-SR #A, and the FlexO #2 and the FlexO #4 are interleave-multiplexed into the FlexO-SR #B.

Then, for the two FlexO-SR frames, a 10-bit block of the FlexO-SR #A and a 10-bit block of the FlexO-SR #B are placed in the 400 G FlexO-SR in the unit of 10 bits. To be specific, the 400G FlexO-SR includes a first 10-bit block of the FlexO-SR #A, a first 10-bit block of the FlexO-SR #B, a second 10-bit block of the FlexO-SR #A, a second 10-bit block of the FlexO-SR #B, and the like. It should be noted that, performing interleave-multiplexing based on 10 bits is only an example, and interleave-multiplexing may alternatively be performed based on a multiple of 10 bits.

It should be noted that, for the step, the steps shown in FIG. 9 may alternatively not be used (that is, interleave-multiplexing is performed a plurality of times), but interleave-multiplexing is directly performed once on the four FlexO instance frames, to obtain the first FlexO frames.

In a pall 703, m second FlexO frames are generated after scrambling and FEC coding processing are performed on the m first FlexO frames.

This step is similar to the pall 503 in FIG. 4. For some explanations and descriptions, refer to the related descriptions. Details are not described herein again. A main difference is that the processed frames have different sizes. In this step, both sizes of the first FlexO frame and the second FlexO frame are approximately 400 Gbps. Correspondingly, a size of an AM area and padding content in this embodiment are also different. An example in which an AM area of a second 400 G FlexO frame header includes 1920 bits, and is divided into 16 logical channels is used below for description.

Each of the 16 logical channels includes 120 bits, and is denoted as an am i, where i=0, 1, and 2 to 15. An AM area in the FlexO-SR #A includes an am 0, an am 2, an am 4, an am 6, an am 8, an am 10, an am 12, an am 14, an am 1, an am 3, an am 5, an am 7, an am 9, an am 11, an am 13, and an am 15 on which 10-bit interleave-multiplexing is performed in order. An AM area in the FlexO-SR #B includes an am 1, an am 3, an am 5, an am 7, an am 9, an am 11, an am 13, an am 15, an am 0, an am 2, an am 4, an am 6, an am 8, an am 10, an am 12, and an am 14 on which 10-bit interleave-multiplexing is performed in order. When the two FlexO-SRs are multiplexed into a second FlexO frame, an AM area of the generated second FlexO frame includes an am 0, an am 1, an am 2, an am 3, an am 4, an am 5, an am 6, an am 7, an am 8, an am 9, an am 10, an am 11, an am 12, an am 13, an am 14, and an am 15 on which 10-bit interleave-multiplexing is performed. Table 2 shows an example of padding information of the am i of the 16 logical channels. For meanings of a CM, UP, and a UM, refer to the related descriptions in Table 1. Details are not described herein again.

be further noted that, this step is an inverse step of step 704 that is performed by the transmitting end described above. That is, N3 may need to demultiplex received data and perform data reconstitution to recover the second FlexO frames. For details, refer to the descriptions of the first step of the receive end in Embodiment 1. Details are not described herein again.

In a part 801, m third FlexO frames are generated after FEC decoding processing and descrambling are performed on the m second FlexO frames.

Specifically, this step is an inverse process of step 703. This step is similar to step 601 in Embodiment 1. For details, refer to the related descriptions. Details are not described

TABLE 2

Example of values of a channel am i of an AM area of a 400 G first FlexO frame

| Logical Channel Number | Value Example {CM 0, CM 1, CM 2, UP 0, CM 3, CM 4, CM 5, UP 1, UM 0, UM 1, UM 2, UP 2, UM 3, UM 4, UM 5} | | | | | | | | | | | | | | |
|---|---|---|---|---|---|---|---|---|---|---|---|---|---|---|---|
| am 0 | 59 | 52 | 64 | 6D | A6 | AD | 9B | 9B | 80 | 8E | CF | 64 | 7f | 71 | 30 |
| am 1 | 59 | 52 | 64 | 20 | A6 | AD | 9B | E6 | 5A | 7B | 7E | 19 | A5 | 84 | 81 |
| am 2 | 59 | 52 | 64 | 62 | A6 | AD | 9B | 7F | 7C | CF | 6A | 80 | 83 | 30 | 95 |
| am 3 | 59 | 52 | 64 | 5A | A6 | AD | 9B | 21 | 61 | 01 | 0B | DE | 9E | FE | F4 |
| am 4 | 59 | 52 | 64 | 87 | A6 | AD | 9B | 98 | 54 | 8A | 4F | 67 | AB | 75 | B0 |
| am 5 | 59 | 52 | 64 | 4F | A6 | AD | 9B | 72 | 48 | F2 | 8B | 8D | B7 | 0D | 74 |
| am 6 | 59 | 52 | 64 | BC | A6 | AD | 9B | 77 | 42 | 39 | 85 | 88 | BD | C6 | 7A |
| am 7 | 59 | 52 | 64 | 44 | A6 | AD | 9B | 4C | 6B | 6E | DA | B3 | 94 | 91 | 25 |
| am 8 | 59 | 52 | 64 | 06 | A6 | AD | 9B | F9 | 87 | CE | AE | 06 | 78 | 31 | 51 |
| am 9 | 59 | 52 | 64 | D6 | A6 | AD | 9B | 45 | 8E | 23 | 3C | BA | 71 | DC | C3 |
| am 10 | 59 | 52 | 64 | 5F | A6 | AD | 9B | 20 | A9 | 07 | 1B | DF | 56 | 28 | E4 |
| am 11 | 59 | 52 | 64 | 36 | A6 | AD | 9B | 8E | 44 | 66 | 1C | 71 | BB | 99 | E3 |
| am 12 | 59 | 52 | 64 | 18 | A6 | AD | 9B | DA | 45 | 6F | A9 | 25 | BA | 90 | 56 |
| am 13 | 59 | 52 | 64 | 28 | A6 | AD | 9B | 33 | 8C | E9 | C3 | CC | 73 | 16 | 3C |
| am 14 | 59 | 52 | 64 | 0B | A6 | AD | 9B | 8D | 53 | DF | 65 | 72 | AC | 20 | 9A |
| am 15 | 59 | 52 | 64 | 2D | A6 | AD | 9B | 6A | 65 | 5D | 9E | 95 | 9A | A2 | 61 |

In a part 704, the m second FlexO frames are sent by using a 400 G optical module.

This step is similar to step 504 in FIG. 4. A difference is that this embodiment specifies that a used optical module has a different rate. Specifically, a rate of the second FlexO frame is approximately 400 Gbps, and one second FlexO frame is sent to an optical fiber by using one 400 G optical module and is transmitted to a destination node, for example, N3 in the example. Correspondingly, due to the different rates, quantities of logical channels obtained through division in a processing process may be different. For example, for specific processing in the current step, one second FlexO frame may be divided into 16 logical channels, and a corresponding quantity of logical channels are formed after bit interleave-multiplexing is performed according to a granularity and a quantity of input ports of the 400 G optical module. For example, using an example in which the optical module has eight input ports (that is, FOIC4.8), the 16 logical channels need to be multiplexed into eight logical channels, and then the eight logical channels are entered into the optical module. For another example, if k=4, the 16 logical channels are multiplexed into four logical channels, and then the four logical channels are entered into the optical module (that is, FOIC4.4).

N3, as an example of the receiving end device, performs the following steps.

In a part 704, the m second FlexO frames are received by using the 400 G optical module.

Specifically, N3, as a receiving end, receives the m second FlexO frames by using the 400 G optical module. It should herein again. A difference is that a rate and a format of a processed frame are different.

In a part 802, dis-interleaving is performed on each FlexO frame of the m third FlexO frames, where each FlexO frame generates a maximum of four FlexO instance frames, the m third FlexO frames generate n 100 G FlexO instance frames in total after being demultiplexed, m is greater than or equal to n/4, and both n and m are positive integers.

Specifically, this step is an inverse process of step 702. Specifically, bit demultiplexing, for example, 10-bit demultiplexing, is performed in this step, so that the m third FlexO frames may be demultiplexed into the n FlexO instance frames, and each FlexO frame is demultiplexed into a maximum of four FlexO instance frames. Using an example in which the transmitting end sends two second FlexO frames (including only five FlexO instance frames), the receiving end may parse out a total of five FlexO instance frames from two third FlexO frames. One third FlexO frame is demultiplexed into one FlexO instance frame and a plurality of unequipped FlexO instance frames. Alternatively, each third FlexO frame is demultiplexed into some unequipped FlexO instance frames. N3 may identify the unequipped FlexO instance frame by using a GID carried by the FlexO instance frame, and discard the frame. Assuming that the FlexO frame sent by the transmitting end includes four FlexO instance frames, the FlexO instance frames parsed out by the receiving end and the third FlexO frames are in a multiple relationship, that is, the former is fourfold the latter.

In a part 803, n 100 G OTU signals are demapped from the n 100 G FlexO instance frames.

Specifically, in this step, the OTU signals are obtained from payload areas of the FlexO instance frames. A corresponding quantity of OTU signals to that of FlexO instance frames may be obtained.

In the method for transmitting an OTU signal described in this embodiment of the present invention, a network device may use a higher-rate 400 G optical module, to reduce network costs and increase network capacity. Optionally, 10-bit interleave-multiplexing is performed, ensuring integrity of FEC processing on an OTU signal, and improving a transmission capability. It should be noted that, interleave-multiplexing of a multiple of 10 bits may alternatively be performed to implement the foregoing advantageous effects.

Embodiment 3

Figure 10:
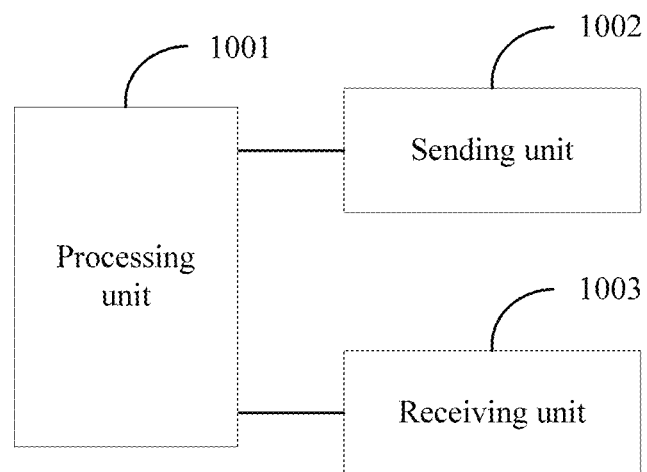
FIG. 10 is a schematic diagram of a possible structure of a network device.

FIG. 10 is a schematic diagram of a possible structure of a network device. The network device includes a processing unit 1001, a sending unit 1002, and a receiving unit 1003. It should be noted that, the network device may be configured to implement the network devices executing different operations mentioned in Embodiment 1 and Embodiment 2, to transmit a high-rate optical signal. Some examples are provided below. It should be further noted that the sending unit or the receiving unit may be an optional unit.

Figure 11:
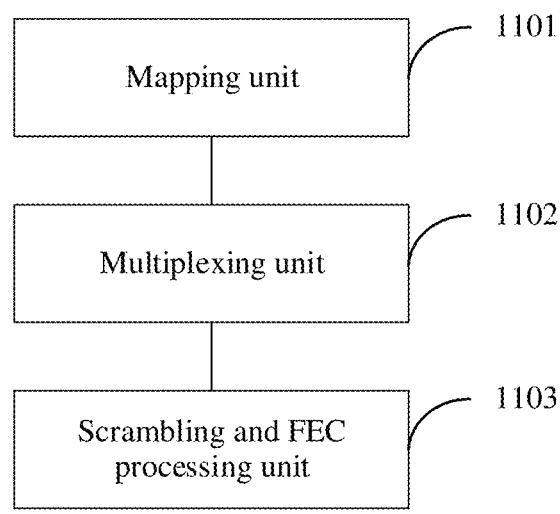
FIG. 11 is a schematic diagram of a possible function division of a processor.
Figure 12:
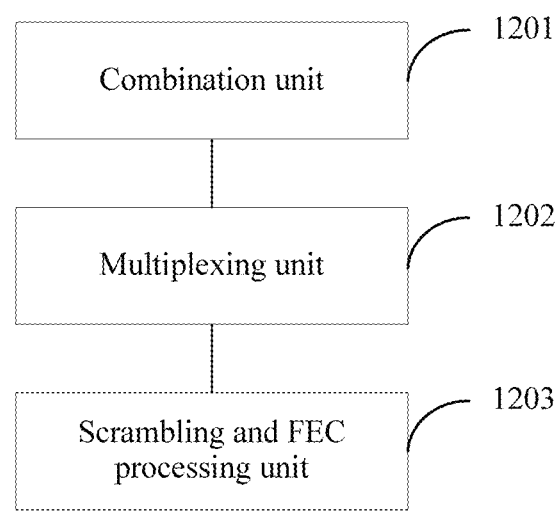
FIG. 12 is a schematic diagram of a possible function division of a processor.

In a possible implementation, the network device is a device performing the steps shown in FIG. 3A, the sending device shown in FIG. 4, or the sending device shown in FIG. 8. Specifically, the processing unit 1001 is configured to: perform the first three steps in FIG. 3A, perform steps 501 to 503 in FIG. 4, or perform steps 701 to 703 in FIG. 8. Optionally, the processing unit may be further divided into logical units in FIG. 11, that is, a mapping unit 1101, a multiplexing unit 1102, and a scrambling and FEC processing unit 1103, respectively configured to process the foregoing three steps. The sending unit is configured to perform 504 shown in FIG. 4 or step 704 shown in FIG. 8. Optionally, the processing unit 1001 may be further divided into logical units in FIG. 12, that is, a combination unit 1201, a multiplexing unit 1202, and a scrambling and FEC processing unit 1203, respectively configured to perform steps 201 to 203 shown in FIG. 3A.

In another possible implementation, the network device is the receiving device shown in FIG. 4 or the receiving device in FIG. 8. Specifically, the processing unit 1001 is configured to: perform steps 601 to 603 in FIG. 4, or perform steps 801 to 803 in FIG. 8. Optionally, the processing unit may be further divided into the logical units in FIG. 11, that is, the mapping unit 1101, the multiplexing unit 1102, and the scrambling and FEC processing unit 1103, respectively configured to process the foregoing three steps. It should be noted that the mapping unit, the multiplexing unit, and the scrambling and FEC processing unit are respectively configured to perform demapping, demultiplexing, and decoding processing. The receiving unit is configured to receive a data frame sent in 504 shown in FIG. 4 or step 704 shown in FIG. 8.

In still another possible implementation, the network device has two capabilities: sending and receiving a FlexO frame. For specific execution functions, refer to the descriptions in the foregoing implementations. Details are not described herein again.

This embodiment of the present invention further provides a chip. A circuit configured to implement a function of the processor 1001 and one or more interfaces are both integrated in the chip. When a memory is integrated in the chip, the chip is connected to an optical module through the interface, so that the FlexO frame mentioned in the foregoing method embodiment is sent to another network device by using the optical module, or a frame sent by another network device is received from the optical module. When no memory is integrated in the chip, the chip may be connected to an external memory through the interface, and the chip implements, based on program code stored in the external memory, the actions executed in the network device in the foregoing embodiment, and sends and receives a data frame by using an optical module connected to the chip. Optionally, functions supported by the chip may include the frame processing steps mentioned in Embodiment 1 and Embodiment 2, and are not described herein again.

It should be noted that the operations correspondingly executed by the units are only specific examples. For operations actually executed by the units, refer to the operations/steps mentioned in the descriptions of Embodiment 1 and Embodiment 2. It should be further noted that the units may be located in the line board in the diagram of the hardware structure of the OTN device in FIG. 2. A location of each unit in a specific board is not limited in the present invention.

It should be further noted that the processing unit, the sending unit, the receiving unit, and the transceiver unit may be replaced with a processor, a transmitter, a receiver, and a transceiver. It should be further noted that the sending unit may be an optical module having only a sending function or an optical module having two functions: receiving and sending. The receiving unit may be an optical module having only a receiving function or an optical module having two functions: receiving and sending.

A person of ordinary skill in the art may understand that all or some of the steps of the embodiments may be implemented by hardware or a program instructing related hardware. The program may be stored in a computer-readable storage medium. The storage medium may include: a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logical device, a transistor logical device, a hardware component, or any combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

When software is used to implement the embodiments, the method steps in the foregoing embodiments may be implemented completely or partially in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be finally noted that the foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method, comprises:
mapping, by a first optical network device, n optical transport unit (OTU) signals to n Flexible Optical transport network (FlexO) instance frames, each of the n OTU signals being mapped to a different one of the n FlexO instance frames, wherein each of the n OTU signals are about 100 Gigabit per second (Gbps) and each of the n FlexO instance frames are about 100 Gbps;
multiplexing, by the first optical network device, every t of the n FlexO instance frames to generate m first FlexO frames, wherein both n and t are integers greater than or equal to 2, m is an integer and is greater than or equal to n/t, wherein each of the m first FlexO frames comprises a plurality of interleaved FlexO instance frames;
generating, by the first optical network device, m second FlexO frames by performing scrambling and forward error correction (FEC) coding on the m first FlexO frames; and
sending, by the first optical network device, each of the m second FlexO frames using a different one of m optical modules to a second optical network device.

2. The method according to claim 1, wherein a granularity of the multiplexing is 10 bits or multiple times of 10 bits.

3. The method according to claim 2, wherein:
t=4, and a rate of each of them second FlexO frames is about 400 Gbps.

4. The method according to claim 2, wherein multiplexing, by the first optical network device, every t of the n FlexO instance frames to generate the m first FlexO frames comprises:
generating a plurality of groups comprising the n FlexO instance frames and k unequipped FlexO instance frames, each of the plurality of groups comprising t instance frames; and
multiplexing, by the first optical network device, the instance frames in each of the plurality of groups to generate the m first FlexO frames, wherein (n+k)/t is an integer not smaller than m.

5. The method according to claim 4, further comprising:
setting Group Identifier (GID) field of each of the unequipped FlexO instance frames to a preset value to indicate a corresponding unequipped FlexO instance frame carries no valid OTU signal.

6. The method according to claim 5, wherein the GID field is set to all zeros.

7. The method according to claim 1, wherein generating the m second FlexO frames by performing scrambling and FEC coding on the m first FlexO frames comprises:
after scrambling the m first FlexO frames, inserting, by the first optical network device, frame header indication information, to generate m third FlexO frames;
dividing each of the m third FlexO frames into two another FlexO instance frames and performing FEC coding on each of the two another FlexO instance frames; and
generating, by the first optical network device, each of the m second FlexO frames by multiplexing each pair of the two another FlexO instance frames on which FEC coding is performed.

8. An optical transport network (OTN) device comprising:
one or more processors configured to:
map n optical transport unit (OTU) signals to n Flexible Optical transport network (FlexO) instance frames, each of the n OTU signals being mapped to a different one of the n FlexO instance frames, each of the n OTU signals being about 100 Gigabit per second (Gbps) and each of the n FlexO instance frames being about 100 Gbps;
multiplex every t of the n FlexO instance frames to generate m first FlexO frames, wherein both n and t are integers greater than or equal to 2, m is an integer and is greater than or equal to n/t, wherein each of the m first FlexO frames comprises a plurality of interleaved FlexO instance frames;
generate m second FlexO frames by performing scrambling and forward error correction (FEC) coding on the m first FlexO frames; and
send the m second FlexO frames to m optical modules; and
the m optical modules being configured to send each of the m second FlexO frames using a different one of the m optical modules.

9. The device according to claim 8, wherein a granularity of the multiplexing is 10 bits or multiple times of 10 bits.

10. The device according to claim 8, wherein:
t=4, and a rate of each of them second FlexO frames is 400 Gbps.

11. The device according to claim 8, wherein the one or more processors are configured to multiplex every t of the n FlexO instance frames to generate the m first FlexO frames by:
generating a plurality of groups comprising the n FlexO instance frames and k unequipped FlexO instance frames, each of the plurality of groups comprising t instance frames; and
multiplexing the instance frames in each of the plurality of groups to generate the m first FlexO frames, wherein (n+k)/t is an integer not smaller than m.

12. The device according to claim 11, wherein the one or more processors are further configured to:
set Group Identifier (GID) field of each of the unequipped FlexO instance frames to a preset value to indicate a corresponding unequipped FlexO instance frame carries no valid OTU signal.

13. The device according to claim 12, wherein the preset value is all zeros.

14. A method, comprising:
sending, by a first device, client service data;
receiving, by a second device, the client service data;
mapping, by the second device, the client service data, into n optical transport unit (OTU) signals;
mapping, by the second device, the n OTU signals to n Flexible Optical transport network (FlexO) instance frames, each of the n OTU signals being mapped to a different one of the n FlexO instance frames, each of the n OTU signals are about 100 Gigabit per second (Gbps) and each of the n FlexO instance frames are about 100 Gbps;

multiplexing, by the second device, every t of the n FlexO instance frames to generate m first FlexO frames, wherein both n and t are integers greater than or equal to 2, m is an integer and is greater than or equal to n/t, wherein each of the m first FlexO frames comprises a plurality of interleaved FlexO instance frames;

obtaining, by the second device, m second FlexO frames by performing scrambling and forward error correction (FEC) coding on the m first FlexO frames; and sending, by the second device, each of the m second FlexO frames using a different one of m optical modules to a third device.

15. The method according to claim 14, wherein a type of the client service data is Ethernet or Packet.

16. The method according to claim 14, wherein a granularity of the multiplexing is 10 bits or multiple times of 10 bits.

17. The method according to claim 14, wherein:
t=4, and a rate of each of them second FlexO frames is about 400 Gbps.

18. The method according to claim 14, wherein multiplexing, by the second device, every t of the n FlexO instance frames to generate the m first FlexO frames comprises:

multiplexing, by the second device, every t of the n FlexO instance frames and k unequipped FlexO instance frames to generate the m first FlexO frames, wherein (n+k)/t is an integer not smaller than m.

19. The method according to claim 18, further comprising:

setting Group Identifier (GID) field of each of the unequipped FlexO instance frames to a preset value to indicate a corresponding unequipped FlexO instance frame carries no valid OTU signal.

20. The method according to claim 19, wherein the GID field is set to all zeros.

* * * * *